United States Patent
Isoda et al.

(10) Patent No.: US 9,981,876 B2
(45) Date of Patent: May 29, 2018

(54) MULLITE-CONTAINING SINTERED BODY, METHOD FOR MANUFACTURING THE SAME, AND COMPOSITE SUBSTRATE

(71) Applicant: NGK INSULATORS, LTD., Nagoya (JP)

(72) Inventors: Yoshinori Isoda, Ichinomiya (JP); Yoshio Suzuki, Nagoya (JP); Katsuhiro Inoue, Ama-Gun (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 0 days. days.

(21) Appl. No.: 15/454,180

(22) Filed: Mar. 9, 2017

(65) Prior Publication Data

US 2017/0275206 A1    Sep. 28, 2017

(30) Foreign Application Priority Data

Mar. 23, 2016 (JP) .................................. 2016-058970

(51) Int. Cl.
| | | |
|---|---|---|
| *C04B 35/185* | (2006.01) |
| *C04B 35/584* | (2006.01) |
| *C04B 35/597* | (2006.01) |
| *C04B 35/599* | (2006.01) |
| *C04B 35/645* | (2006.01) |
| *B32B 9/00* | (2006.01) |

(52) U.S. Cl.
CPC .......... *C04B 35/185* (2013.01); *C04B 35/645* (2013.01); *B32B 9/005* (2013.01); *C04B 2235/3463* (2013.01); *C04B 2235/3873* (2013.01); *C04B 2235/5436* (2013.01); *C04B 2235/602* (2013.01); *C04B 2235/656* (2013.01); *C04B 2235/786* (2013.01); *C04B 2235/9607* (2013.01)

(58) Field of Classification Search
CPC .... C04B 35/185; C04B 35/587; C04B 35/597
See application file for complete search history.

(56) References Cited

U.S. PATENT DOCUMENTS

2016/0185668 A1    6/2016   Isoda et al.

FOREIGN PATENT DOCUMENTS

| JP | 02069359 A | * | 3/1990 |
| JP | 5585570 B2 | | 9/2014 |
| JP | 5861016 B1 | | 2/2016 |

* cited by examiner

*Primary Examiner* — Karl E Group
(74) *Attorney, Agent, or Firm* — Burr & Brown, PLLC

(57) ABSTRACT

A mullite-containing sintered body according to the present invention contains mullite and at least one selected from the group consisting of silicon nitride, silicon oxynitride, and sialon. It is preferable that the mullite-containing sintered body have a thermal expansion coefficient of less than 4.3 ppm/° C. at 40° C. to 400° C., an open porosity of 0.5% or less, and an average grain size of 1.5 μm or less.

7 Claims, 2 Drawing Sheets

MULLITE-CONTAINING SINTERED BODY, METHOD FOR MANUFACTURING THE SAME, AND COMPOSITE SUBSTRATE

BACKGROUND OF THE INVENTION

1. Field of the Invention

The present invention relates to a mullite-containing sintered body, a method for manufacturing the same, and a composite substrate.

2. Description of the Related Art

In general, a mullite sintered body is a material, which is produced by sintering an aluminum oxide ($Al_2O_3$) and a silicon oxide ($SiO_2$) in a ratio of 3 to 2 and which has excellent thermal shock resistance, and is represented by $3Al_2O_3 \cdot 2SiO_2$. Regarding such a mullite sintered body, a material produced by forming a powder, in which 30 percent by mass of yttria-stabilized zirconia (YSZ) powder is mixed into a mullite powder, and sintering the resulting compact is known, as disclosed in, for example, PTL 1. In PTL 1, a base substrate to be bonded to a GaN substrate is produced by cutting a mullite substrate from the mullite sintered body and polishing a principal surface of the mullite substrate. The thermal expansion coefficient of GaN is specified as 6.0 ppm/K in the range of room temperature to 1,000° C. and the thermal expansion coefficient of mullite is specified as 5.2 ppm/K. Therefore, in consideration of the two substrates being bonded to each other when the two substrates are used, it is preferable that the thermal expansion coefficient of mullite be increased so as to approach the thermal expansion coefficient of the GaN substrate. Consequently, the YSZ powder is mixed into the mullite powder and sintering is performed.

PTL 2 describes an example in which a composite substrate produced by directly bonding a functional substrate composed of lithium tantalate, lithium niobate, or the like to a support substrate composed of a mullite sintered body is used for acoustic wave devices, e.g., a surface acoustic wave element. Regarding such an acoustic wave device, the mullite substrate serving as the support substrate has a small thermal expansion coefficient of about 4.4 ppm/° C. (40° C. to 400° C.) and a large Young's modulus of 220 GPa or more. Therefore, expansion and shrinkage due to temperature changes of the acoustic wave device itself can be reduced and, as a result, the temperature dependence of frequency is improved to a great extent. In order to directly bond the functional substrate to the support substrate, it is required that each bonding surface have high smoothness. For example, PTL 2 mentions that the center line average roughness Ra is preferably 3 nm or less.

CITATION LIST

Patent Literature

PTL 1: Japanese Patent No. 5585570
PTL 2: Japanese Patent No. 5861016

SUMMARY OF THE INVENTION

A mullite sintered body having a thermal expansion coefficient increased by adding a large amount of another component to mullite is described in PTL 1 and a mullite sintered body having a high mullite purity is described in PTL 2. However, a mullite sintered body having a reduced thermal expansion coefficient is not described. Further, a low-thermal-expansion mullite sintered body, as described above, in which the surface smoothness of a polish finished surface is high, is not known. In this regard, in the case where a mullite sintered body that exhibits low thermal expansion but low rigidity is used as a support substrate of a composite substrate, the composite substrate may warp due to a slight temperature difference.

The present invention was made so as to solve the above-described problems, and the main object is to provide a mullite-containing sintered body having a low thermal expansion coefficient, high rigidity, and high smoothness of a polished surface compared with mullite alone.

A mullite-containing sintered body according to the present invention contains mullite and at least one selected from the group consisting of silicon nitride, silicon oxynitride, and sialon, wherein the mullite-containing sintered body has a thermal expansion coefficient of less than 4.3 ppm/° C. at 40° C. to 400° C., an open porosity of 0.5% or less, and an average grain size (average grain size of sintered particles) of 1.5 μm or less. The mullite-containing sintered body has a low thermal expansion coefficient and high rigidity compared with mullite alone. In addition, the smoothness of a polished surface can be made high.

A method for manufacturing a mullite-containing sintered body according to the present invention includes (a) producing a mixed raw material powder by mixing 50 to 90 percent by volume of mullite powder having an average particle diameter of 1.5 μm or less and 10 to 50 percent by volume of silicon nitride powder having an average particle diameter of 1 μm or less such that the total is 100 percent by volume, and (b) producing the mullite-containing sintered body by forming the mixed raw material powder into a compact having a predetermined shape and subjecting the compact to hot press firing at a pressing pressure of 20 to 300 kgf/cm² and a firing temperature of 1,525° C. to 1,700° C. This manufacturing method is suitable for producing the above-described mullite-containing sintered body according to the present invention. In this regard, the average particle diameter of the powder is a value measured by using a laser diffraction method (the same goes for the following).

A composite substrate according to the present invention is a composite substrate in which a functional substrate is bonded to a support substrate, and the support substrate is the above-described mullite-containing sintered body. This composite substrate is favorably bonded to the functional substrate because the smoothness of the polished surface of the mullite-containing sintered body serving as the support substrate is high. Also, in the case where the composite substrate is used for a surface acoustic wave device, the temperature dependence of frequency is improved to a great extent. Also, the performance of an optical waveguide device, an LED device, or a switch device is enhanced because the thermal expansion coefficient of the support substrate is small.

DETAILED DESCRIPTION OF THE INVENTION

Figure 1:
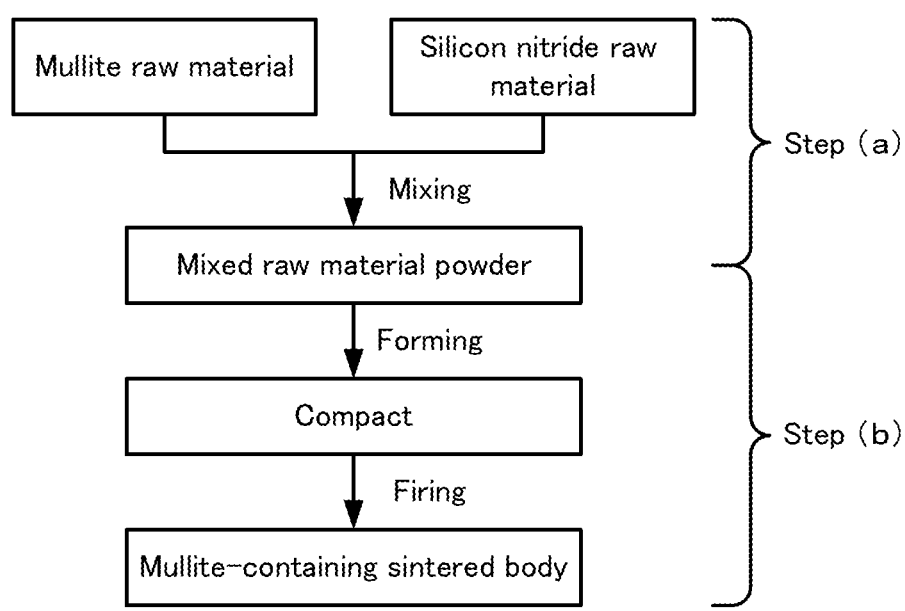
FIG. 1 is a production step diagram of a mullite-containing sintered body.

The embodiments according to the present invention will be specifically described below but the present invention is not limited to the embodiments below. It should be understood that modifications and improvements are appropriately made based on the common knowledge of persons skilled in the art without departing from the gist of the invention.

A mullite-containing sintered body according to the present embodiment contains mullite and at least one selected from the group consisting of silicon nitride, silicon oxynitride, and sialon. It is preferable that mullite be a component contained in the sintered body in the largest amount (primary component). However, a component selected from the above-described group may be a primary component. Preferably, the mullite-containing sintered body has a thermal expansion coefficient of less than 4.3 ppm/° C. at 40° C. to 400° C., an open porosity of 0.5% or less, and an average grain size of 1.5 μm or less. The mullite-containing sintered body has a low thermal expansion coefficient and high Young's modulus (rigidity) compared with mullite alone. In addition, the smoothness of a polish finished surface (polished surface) of the mullite-containing sintered body is high because the open porosity is 0.5% or less, pores are negligibly included, and the average grain size is as small as 1.5 μm or less.

Regarding the mullite-containing sintered body according to the present embodiment, the number of pores that have a maximum length of 1 μm or more present in an area of 100 μm×100 μm of a polished surface is preferably 10 or less. In the case where the number of pores is 10 or less, the smoothness of the polish finished surface is enhanced. The number of such pores is more preferably 3 or less, and further preferably zero.

The mullite-containing sintered body according to the present embodiment preferably has a Young's modulus of 240 GPa or more and preferably has a four-point bending strength of 300 MPa or more. The Young's modulus and the strength of silicon nitride and components derived therefrom are higher than those of mullite. Therefore, the Young's modulus of the mullite-containing sintered body can be made to be 240 GPa or more and the four-point bending strength can be made to be 300 MPa or more by adjusting the proportion of silicon nitride added to mullite. In this regard, the four-point bending strength is more preferably 320 MPa or more.

The mullite-containing sintered body according to the present embodiment preferably has a center line average roughness Ra of the polished surface of 1.5 nm or less. A composite substrate produced by bonding a functional substrate to a support substrate is known as a composite substrate used for an acoustic wave device and the like. The bondability between the support substrate and the functional substrate is made to be good by using the above-described mullite-containing sintered body having Ra of the polished surface of 1.5 nm or less as the support substrate. For example, the proportion of the bonding interface that is actually bonded (bonding area proportion) is 80% or more (preferably 90% or more). The center line average roughness Ra of the polished surface is more preferably 1.1 nm or less, and further preferably 1.0 nm or less.

The mullite-containing sintered body according to the present embodiment more preferably has a thermal expansion coefficient of 3.8 ppm/° C. or less at 40° C. to 400° C. In the case where a composite substrate, in which the support substrate is such a mullite-containing sintered body, is used for an acoustic wave device, when the temperature of the acoustic wave device increases, thermal expansion of the functional substrate is reduced compared with the intrinsic thermal expansion and, thereby, the temperature dependence of frequency of the acoustic wave device is improved. The thermal expansion coefficient is further preferably 3.5 ppm/° C. or less at 40° C. to 400° C.

Next, an embodiment of a method for manufacturing the mullite-containing sintered body according to the present invention will be described. As shown in FIG. 1, a production flow of the mullite-containing sintered body includes (a) a step of preparing a mixed raw material powder and (b) a step of producing the mullite-containing sintered body.

Step (a): Preparation of Mixed Raw Material Powder

The mixed raw material powder is prepared by mixing a mullite powder and a silicon nitride powder. Preferably, a powder having a high purity and a small average particle diameter is used as a mullite raw material. The purity is preferably 99.0% or more, more preferably 99.5% or more, and further preferably 99.8% or more. The unit of measurement of the purity is percent by mass. Meanwhile, the average particle diameter (D50) is preferably 1.5 μm or less, and more preferably 0.1 to 1.5 μm. Regarding the mullite raw material, a commercially available product may be used, or a material produced by using a high-purity alumina or silica powder may be used. Examples of methods for producing the mullite raw material include a method described in PTL 2. Regarding the silicon nitride raw material, it is preferable that a powder having a small average particle diameter be used. The average particle diameter is preferably 1 μm or less, and more preferably 0.1 to 1 μm. The mullite raw material and the silicon nitride raw material are mixed. For example, the mixed raw material powder may be produced by weighing 50 to 90 percent by volume (preferably 70 to 90 percent by volume) of mullite raw material and 10 to 50 percent by volume (preferably 10 to 30 percent by volume) of silicon nitride raw material such that the total is 100 percent by volume, performing mixing by using a mixer, e.g., a pot mill, and performing drying by using a spray dryer, as necessary.

Step (b): Production of Mullite-Containing Sintered Body

The mixed raw material powder produced in step (a) is formed into a compact having a predetermined shape. There is no particular limitation regarding the forming method and a common forming method can be used. For example, the mixed raw material powder may be press-formed as is by using a mold. In the case of press forming, the formability is enhanced by making the mixed raw material powder into the shape of granules by spray drying. In addition, a body can be produced by adding an organic binder so as to be extruded, or a slurry can be produced so as to be formed as a sheet. In these processes, organic binder components have to be removed before a firing step or during a firing step. Also, high pressure forming may be performed by CIP (cold isostatic pressing).

Subsequently, the resulting compact is fired so as to produce the mullite-containing sintered body. At this time, in order to enhance the surface smoothness of the mullite-containing sintered body, it is preferable to maintain sintered particles fine and to discharge gas during sintering. A very useful technique therefor is a hot press method. In the case where the hot press method is used, densification proceeds in the state of fine granules at a low temperature compared with pressureless sintering, and retention of coarse pores, which is frequently observed in the pressureless sintering, can be suppressed. The firing temperature (maximum temperature) during the hot press is preferably 1,525° C. to 1,700° C. Also, the pressing pressure during the hot press is set to be preferably 20 to 300 kgf/cm$^2$. In particular, a low pressing pressure is preferable because a hot press jig can be reduced in size and the life thereof can be increased. An appropriate time can be selected as the maintenance time at the firing temperature in consideration of the shape and size of the compact, the characteristics of the furnace, and the like. Specifically, the maintenance time is, for example, preferably 1 to 12 hours, and further preferably 2 to 8 hours. There is no particular limitation regarding the firing atmosphere. In general, the atmosphere during hot press is an inert atmosphere, e.g., nitrogen, argon, or the like. The rate of temperature increase and the rate of temperature decrease may be set appropriately in consideration of the shape and size of the compact, the characteristics of the furnace, and the like, and may be set in a range of, for example, 50° C./hr to 300° C./hr.

Figure 2:
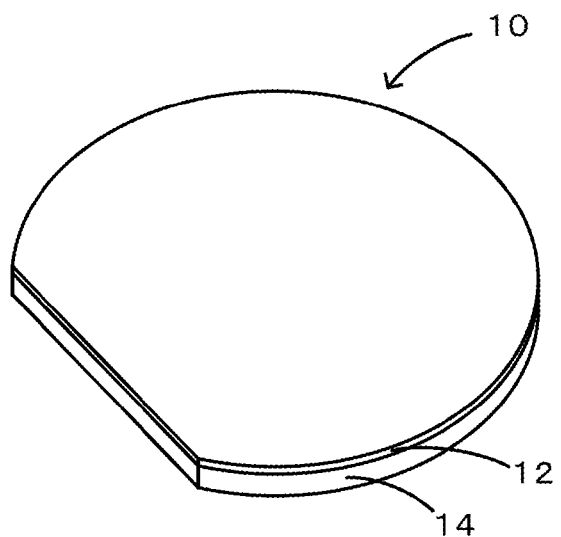
FIG. 2 is a perspective view of a composite substrate 10.

Next, an embodiment of a composite substrate according to the present invention will be described. The composite substrate according to the present embodiment is produced by bonding a functional substrate to a support substrate composed of the above-described mullite-containing sintered body. In the composite substrate, the bonding area proportion between the two substrates is large so as to exhibit good bondability. There is no particular limitation regarding the functional substrate, and examples thereof include lithium tantalate, lithium niobate, gallium nitride, and silicon. The bonding method is preferably direct bonding. In the case of direct bonding, the bonding surface of each of the functional substrate and the support substrate is polished and, thereafter, is activated. The two substrates are pressed while the two bonding surfaces are facing each other. The activation of the bonding surface is performed by, for example, radiating ion beams of inert gas (argon or the like) or radiating plasma or neutral atomic beams. The ratio of the thickness of the functional substrate to the thickness of the support substrate (thickness of functional substrate/thickness of support substrate) is preferably 0.1 or less. FIG. 2 shows an example of a composite substrate. A composite substrate 10 is produced by directly bonding a piezoelectric substrate 12 serving as the functional substrate to a support substrate 14.

Figure 3:
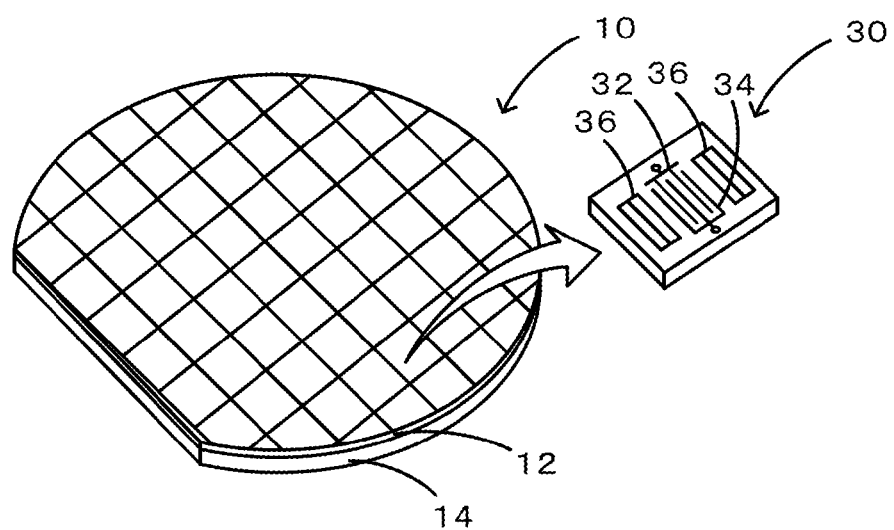
FIG. 3 is a perspective view of an electronic device 30 produced by using the composite substrate 10.

The composite substrate according to the present embodiment can be used for acoustic device and the like. Examples of such electronic devices include acoustic wave devices (a surface acoustic wave device, a Lamb wave element, a thin film resonator (FBAR), and the like) and, in addition, LED devices, optical waveguide devices, and switch devices. In the case where the above-described composite substrate is used for the acoustic wave device, the temperature dependence of frequency is improved to a great extent because the thermal expansion coefficient of the mullite-containing sintered body serving as the support substrate is less than 4.3 ppm/° C. (40° C. to 400° C.) and is small. FIG. 3 shows an example of an electronic device 30 produced by using the composite substrate 10. The electronic device 30 is a 1-port SAW resonator, that is, a surface acoustic wave device. Initially, the piezoelectric substrate 12 of the composite substrate 10 is provided with a pattern of many electronic devices 30 by using common photolithography technology. Thereafter, each of electronic devices 30 is cut by dicing. In the electronic device 30, IDT (interdigital transducer) electrodes 32 and 34 and reflection electrodes 36 are formed on the surface of the piezoelectric substrate 12 by using photolithography technology.

The present invention is not limited to the above-described embodiment, and can be carried out by various modes as long as they belong to the technical scope of the invention.

EXAMPLES

1. Production of Mixed Raw Material Powder

A commercially available mullite powder having a purity of 99.9% or more and an average particle diameter of 1.5 μm was used as a mullite raw material and a commercially available silicon nitride powder having a purity of 97% or more and an average particle diameter of 0.8 μm was used as a silicon nitride raw material. The mullite raw material and the silicon nitride raw material were weighed at ratios shown in experimental examples 1 to 3 in Table 1 and were mixed in a pot mill by using alumina pebbles having a diameter of 5 mm, and a mixed raw material powder was produced by spray drying.

TABLE 1

| | Composition of raw material powder | | Firing condition | | Evaluation of sintered body | | | | |
|---|---|---|---|---|---|---|---|---|---|
| | | | | | | Ratio of crystal phase*1 | | | |
| | | | | | | (101) face | (3-20) face 2θ = 24.6° | (200) face 2θ = 26.9° | |
| Experimental example | Mullite [vol. %] | Silicon nitride [vol. %] | Firing temperature [° C.] | Pressing pressure [kgf/cm²] | Crystal phase | 2θ = 20.6° of silicon nitride | of Si$_2$Al$_3$O$_7$N of sialon | of Si$_5$AlON$_7$ of sialon | Bulk density [g/cm³] |
| 1 | 90 | 10 | 1650 | 200 | Mullite Silicon nitride sialon | 0.01 | 0.43 | 0.14 | 3.11 |
| 2 | 80 | 20 | 1650 | 200 | Mullite Silicon nitride sialon | 0.03 | 1.72 | 0.63 | 3.08 |
| 3 | 70 | 30 | 1650 | 200 | Mullite Silicon nitride sialon | 0.30 | 1.75 | 1.49 | 3.08 |
| 4 | 100 | 0 | 1650 | 200 | Mullite | — | — | — | 3.16 |

TABLE 1-continued

| | Evaluation of sintered body | | | | | | | |
|---|---|---|---|---|---|---|---|---|
| Experimental example | Open porosity [%] | Young's modulus [MPa] | Bending strength [MPa] | Thermal expansion coefficient [ppm/K] | Number of pores [Number] | Ra [nm] | Average grain size [μm] | Bondability*[2] |
| 1 | <0.1 | 240 | 320 | 4.1 | 0 | 1.1 | 1.2 | Good |
| 2 | <0.1 | 240 | 330 | 3.8 | 0 | 0.9 | 1.1 | Best |
| 3 | <0.1 | 250 | 350 | 3.5 | 0 | 1.0 | 1.1 | Best |
| 4 | <0.1 | 230 | 280 | 4.3 | 0 | 1.0 | 1.5 | Best |

*[1]The peak area of mullite (210) face (2 = 26.2°) in the XRD profile was assumed to be 1, and a peak area of each crystal phase relative to that was specified as the ratio of crystal phase.
*[2]A case where the bonding area proportion in an IR transmission image was 90% or more was ranked as "best", and a case where the proportion was 80% or more and less than 90% was ranked as "good".

2. Production of Mullite-Containing Sintered Body

The mixed raw material powder of each of experimental examples 1 to 3 was put into a mold having a diameter of about 125 mm and was formed into the shape of a disk having a thickness of about 10 to 15 mm by a pressure of 200 kgf/cm$^2$ so as to obtain a mullite-containing compact. Subsequently, the mullite-containing compact was accommodated into a hot-press graphite mold having an inside diameter of about 125 mm, and a mullite-containing sintered body was produced in a hot-press furnace so as to have a diameter of about 125 mm and a thickness of 5 to 8 mm. In this regard, the maximum temperature during firing (firing temperature) was set to be 1,650° C., the maintenance time at the firing temperature was set to be 5 hr, and both the temperature increase rate and the temperature decrease rate were set to be 100° C./hr. The press load was set to be 200 kgf/cm$^2$ at 900° C. or higher during temperature increase, the atmosphere in the furnace was set to be vacuum until 900° C. was reached, and after 900° C. was reached, N$_2$ was introduced so as to perform sintering in N$_2$. After the firing temperature was maintained for a predetermined time, the temperature was decreased to 1,200° C., regulation of the press load and the atmosphere in the furnace was stopped, and natural cooling to room temperature was performed. Meanwhile, in experimental example 4, a compact and a sintered body were produced likewise except that a mullite powder was used alone.

3. Evaluation of Characteristics

Test pieces (flexure bars having a size of 4×3×40 mm and the like) were cut from the sintered bodies of experimental examples 1 to 4, and various characteristics were evaluated. In addition, regarding a polished surface of the sintered body, a surface of a test piece of about 4×3×10 mm was mirror-finished by polishing. Polishing was performed in the order of 3-μm diamond abrasive grains and 0.5-μm diamond abrasive grains, and lapping by using diamond abrasive grains of 0.1 μm or less was performed as final finishing. Evaluated characteristics were as described below.

(1) Crystal Phase

The sintered body was pulverized and a crystal phase was identified by using an X-ray diffractometer. The measurement conditions were set to be CuK$_\alpha$ 50 kV, 300 mA, and 2θ=5° to 70° and a rotating anode XRD diffractometer (RINT produced by Rigaku Industrial Corp.) was used.

(2) Ratio of Crystal Phase

The peak area ratio of each crystal phase was calculated from the XRD profile of the above-described (1). The peak area of mullite (210) face (2θ=26.2°) was assumed to be 1, and a peak area of each crystal phase relative to that was specified as the ratio of crystal phase. Here, regarding the representative peak of each crystal phase, the (101) face (2θ=20.6°) of silicon nitride and the (3-20) face (2θ=24.6°) of Si$_2$Al$_3$O$_7$N and the (200) face (2θ=26.9°) of Si$_5$AlON$_7$ of sialon were used.

(3) Bulk Density and Open Porosity

A flexure bar was used and the bulk density and the open porosity were measured by using an Archimedes method in which pure water was used.

(4) Young's Modulus

The measurement was performed by using a static deflection method in conformity with JIS R1602. The test piece was set to have the shape of a flexure bar of 3 mm×4 mm×40 mm.

(5) Bending Strength

The four-point bending strength was measured in conformity with JIS 81601. The test piece was set to have the shape of a flexure bar of 3 mm×4 mm×40 mm or half the size thereof.

(6) Thermal Expansion Coefficient (40° C. to 400° C.)

The measurement was performed by using a push-rod differential type in conformity with JIS R1618. The shape of the test piece was set to be 3 mm×4 mm×20 mm.

(7) Number of Pores

The polished surface of the sintered body finished as described above was observed by using a SEM, and the number of pores that have a maximum length of 1 μm or more present in 100 μm×100 μm was counted.

(8) Surface Smoothness (Ra)

The center line average roughness Ra of the polished surface of the sintered body finished as described above was measured by using an AFM. The measurement range was set to be 10 μm×10 μm.

(9) Average Grain Size of Sintered Particles

The polished surface of the sintered body finished as described above was subjected to chemical etching by using phosphoric acid, the dimensions of 200 or more of sintered particles were measured by using the SEM, and the average grain size was calculated by using linear analysis. The coefficient of the linear analysis was set to be 1.5, and the value produced by multiplying the length actually measured by using the SEM by 1.5 was taken as the average grain size.

(10) Bondability

A disk having a diameter of about 100 mm and a thickness of about 600 μm was cut from each of the sintered bodies of experimental examples 1 to 4. This disk was polish-finished as described above and, thereafter, was cleaned so as to remove particles, contaminants, and the like on the surface. Subsequently, the resulting disk was used as a support substrate, and a composite substrate was produced by performing direct bonding between the support substrate and the functional substrate. That is, initially the bonding surface of each of the support substrate and the functional substrate was activated by argon ion beams and, thereafter, the two substrates were bonded to each other by being pressed at 10 tonf, while the two bonding surfaces were faced each other, so as to produce a composite substrate. A lithium niobate (LN) substrate was used as functional substrate. Regarding the evaluation of the bondability, a case where the bonding area proportion in an IR transmission image was 90% or more was ranked as "best", a case where the proportion was 80% or more and less than 90% was ranked as "good", and a case where the proportion was less than 80% was ranked as "poor".

4. Evaluation Result

Each of the mullite-containing sintered bodies of experimental examples 1 to 3 was produced by firing the mixed raw material powder in which the mullite raw material and the silicon nitride raw material were mixed, and part of silicon nitride changed to sialon by firing. Each of the mullite-containing sintered bodies of experimental examples 1 to 3 contained silicon nitride and the like and, therefore, the Young's modulus and the four-point bending strength were improved compared with those of the sintered body of mullite alone of experimental example 4. That is, the Young's modulus was improved to 240 GPa or more and the four-point bending strength was improved to 320 MPa or more. In addition, the thermal expansion coefficient of each of the mullite-containing sintered bodies of experimental examples 1 to 3 was less than 4.3 ppm/° C. (3.5 to 4.1 ppm/° C.) at 40° C. to 400° C. and, therefore, the value was lower than that of the sintered body of mullite alone of experimental example 4. Further, regarding each of the mullite-containing sintered bodies of experimental examples 1 to 3 and the sintered body of mullite alone of experimental example 4, the open porosity was 0.5% or less (less than 0.1%), the average grain size was 1.5 µm or less (1.0 to 1.2 µm), and therefore, the center line average roughness Ra of the polished surface was a small as 1.1 nm or less (0.9 to 1.1 nm). Consequently, in the case where a disk cut from each of the sintered bodies of experimental examples 2 to 4 was directly bonded to the functional substrate, the bondability was "best" because the bonding area proportion was 90% or more, and in the case where a disk cut from the sintered body of experimental example 1 was directly bonded to the functional substrate, the bondability was "good" because the bonding area proportion was 80% or more and less than 90%. In this regard, the number of pores being 3 or less (zero) contributed to such reduction in value of the center line average roughness Ra of the polished surface.

Incidentally, experimental examples 1 to 3 correspond to the examples according to the present invention and experimental example 4 corresponds to a comparative example. The present invention is not limited to these examples.

The present application claims priority of Japanese Patent Application No. 2016-058970 filed on Mar. 23, 2016, the entire contents of which are incorporated herein by reference.

What is claimed is:

1. A mullite-containing sintered body comprising mullite and at least one selected from the group consisting of silicon nitride, silicon oxynitride, and sialon,
   wherein the thermal expansion coefficient is less than 4.3 ppm/° C. at 40° C. to 400° C.,
   the open porosity is 0.5% or less, and
   the average grain size is 1.5 µm or less.

2. The mullite-containing sintered body according to claim 1,
   wherein the number of pores that have a maximum length of 1 µm or more present in an area of 100 µm×100 µm of a polished surface is 10 or less.

3. The mullite-containing sintered body according to claim 1,
   wherein the Young's modulus is 240 GPa or more.

4. The mullite-containing sintered body according to claim 1,
   wherein the four-point bending strength is 320 MPa or more.

5. The mullite-containing sintered body according to claim 1,
   wherein the center line average roughness Ra of the polished surface is 1.5 nm or less.

6. A method for manufacturing a mullite-containing sintered body according to claim 1 comprising:
   (a) producing a mixed raw material powder by mixing 50 to 90 percent by volume of mullite powder having an average particle diameter of 1.5 µm or less and 10 to 50 percent by volume of silicon nitride powder having an average particle diameter of 1 µm or less such that the total is 100 percent by volume, and
   (b) producing the mullite-containing sintered body by forming the mixed raw material powder into a compact having a predetermined shape and subjecting the compact to hot press firing at a pressing pressure of 20 to 300 kgf/cm$^2$ and a firing temperature of 1,525° C. to 1,700° C.

7. A composite substrate in which a functional substrate is bonded to a support substrate,
   wherein the support substrate is the mullite-containing sintered body according to claim 1.

* * * * *